United States Patent
Outen et al.

(10) Patent No.: US 9,067,624 B2
(45) Date of Patent: Jun. 30, 2015

(54) CROSS MEMBER FOR A FRAME OF A VEHICLE AS WELL AS FRAME FOR A VEHICLE

(71) Applicant: Daimler AG, Stuttgart (DE)

(72) Inventors: Barry Outen, Hillsboro, OR (US); Justin Yee, Portland, OR (US); Maik Ziegler, Tiefenbronn (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/314,120

(22) Filed: Jun. 25, 2014

(65) Prior Publication Data

US 2015/0001894 A1     Jan. 1, 2015

(30) Foreign Application Priority Data

Jun. 27, 2013    (GB) .................................. 1311429.3

(51) Int. Cl.
     *B62D 21/02*      (2006.01)
     *B62D 33/00*      (2006.01)
     *B62D 29/00*      (2006.01)

(52) U.S. Cl.
     CPC .............. *B62D 21/02* (2013.01); *B62D 29/008* (2013.01)

(58) Field of Classification Search
     CPC ........ B62D 21/02; B62D 21/03; B62D 21/10; B62D 21/12; B62D 21/20; B62D 21/186; B62D 21/18; B62D 21/183; B62D 29/008; B62D 33/00; B62D 33/077; B62D 53/04; B62D 53/06; B62D 53/045; B62D 53/061; B62D 53/062; B62D 53/064; B62D 53/067; B62D 53/068; B62D 63/04; B62D 63/06; B62D 63/08

USPC .......... 296/182.1, 184.1, 193.07, 204, 29, 30; 280/781, 789, 793, 794, 795, 800
     See application file for complete search history.

(56) References Cited

U.S. PATENT DOCUMENTS

| | | | | |
|---|---|---|---|---|
| 1,468,522 | A * | 9/1923 | Snell et al. ..................... | 180/315 |
| 1,591,215 | A * | 7/1926 | Jacobs .......................... | 280/794 |
| 2,139,788 | A * | 12/1938 | Woolson ..................... | 29/897.31 |
| 6,270,153 | B1 * | 8/2001 | Toyao et al. .................. | 296/204 |
| 6,330,778 | B1 * | 12/2001 | Jakobsson ...................... | 52/837 |
| 7,699,384 | B2 * | 4/2010 | Duerr et al. ................... | 296/204 |
| 8,459,399 | B2 * | 6/2013 | Ohashi .......................... | 180/312 |
| 2003/0151242 | A1 * | 8/2003 | Philipps ........................ | 280/794 |
| 2004/0108754 | A1 * | 6/2004 | Igarashi et al. ............... | 296/204 |
| 2009/0243272 | A1 * | 10/2009 | Tanaka et al. ................. | 280/794 |
| 2012/0181781 | A1 * | 7/2012 | Gaussin et al. ............... | 280/800 |
| 2013/0300158 | A1 * | 11/2013 | Andree et al. ................ | 296/204 |
| 2015/0001894 | A1 * | 1/2015 | Outen et al. .................. | 296/204 |

* cited by examiner

*Primary Examiner* — Gregory Blankenship
(74) *Attorney, Agent, or Firm* — Patent Central LLC; Stephan A. Pendorf

(57) ABSTRACT

A cross member for a frame of a vehicle. The cross member provides a particularly high stiffness of the frame and has a particularly low weight. A first support arrangement (18) having 4, 5, 6 or more support legs connects a cross member (10) to a first frame rail (16*a*) of the frame (12), and a second support arrangement (24) having 4, 5, 6 or more further support legs (26*a-d*) connect the cross member (10) to a second frame rail (16*b*) of the frame (12). At least two of the four support legs of the respective first and second support arrangement are bent upwards from the base portion, the other support legs (20*b*, 20*c*) being bent downwards.

10 Claims, 4 Drawing Sheets

Figure 1:
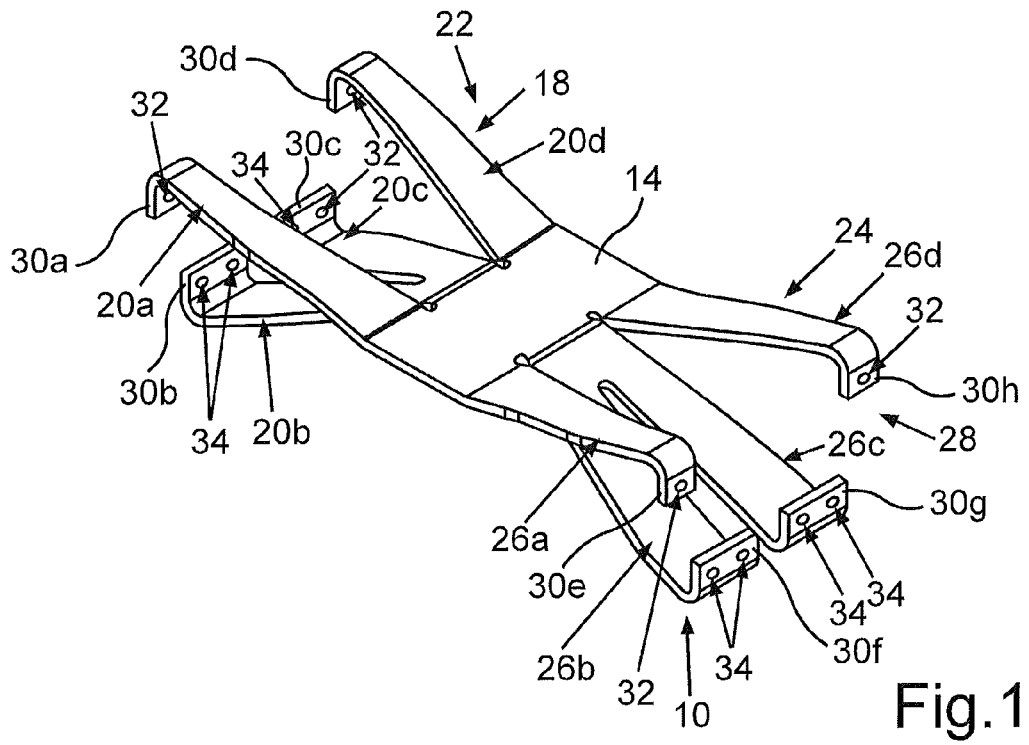

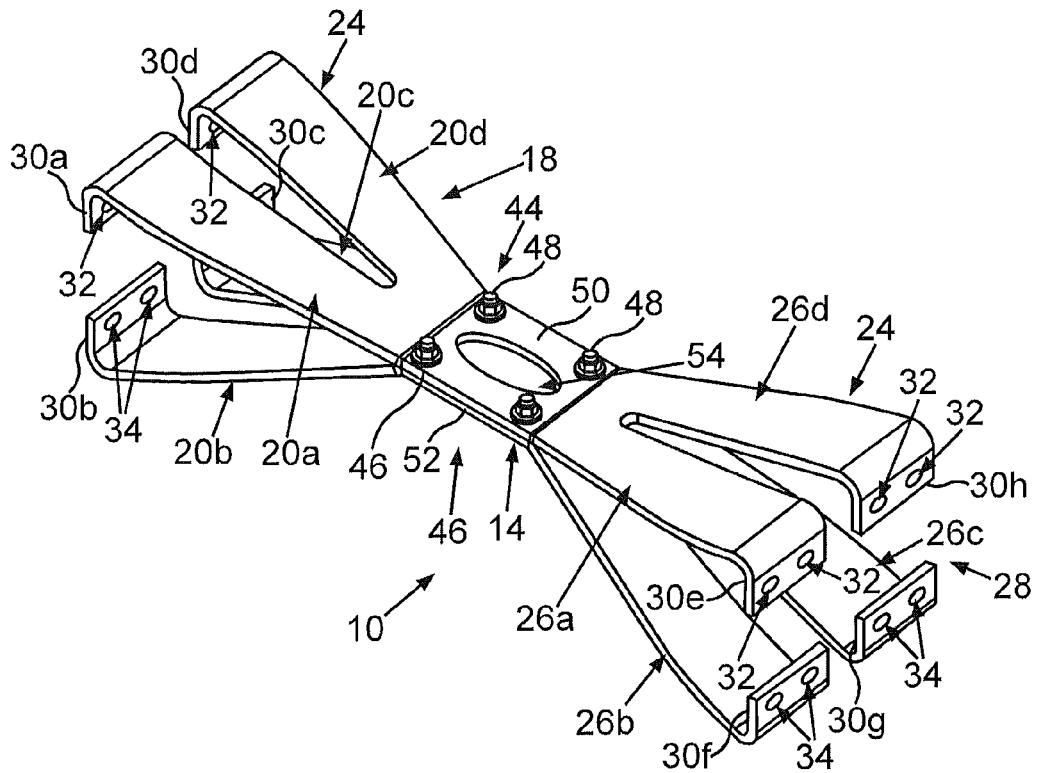
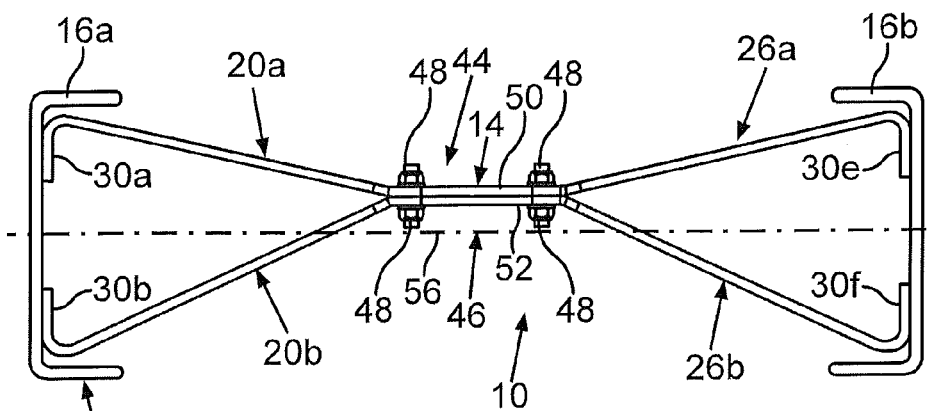

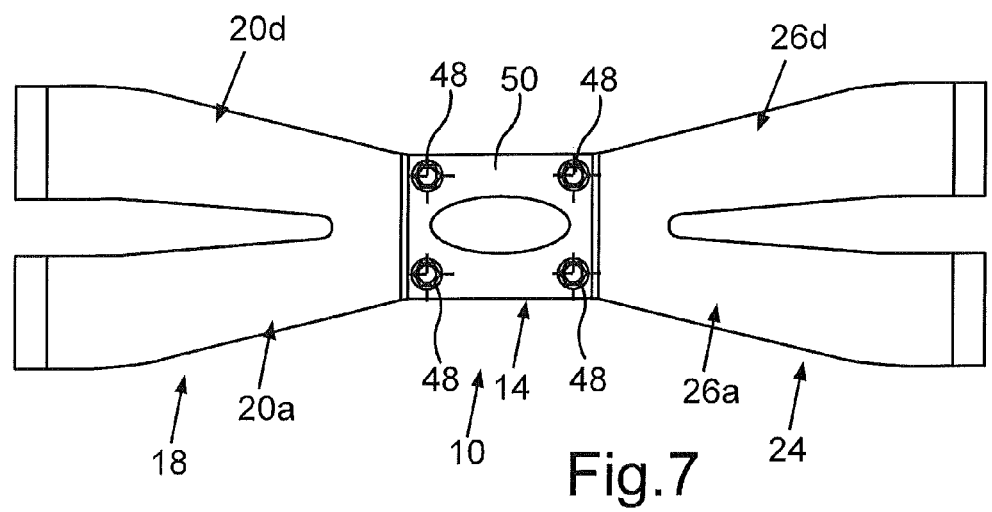
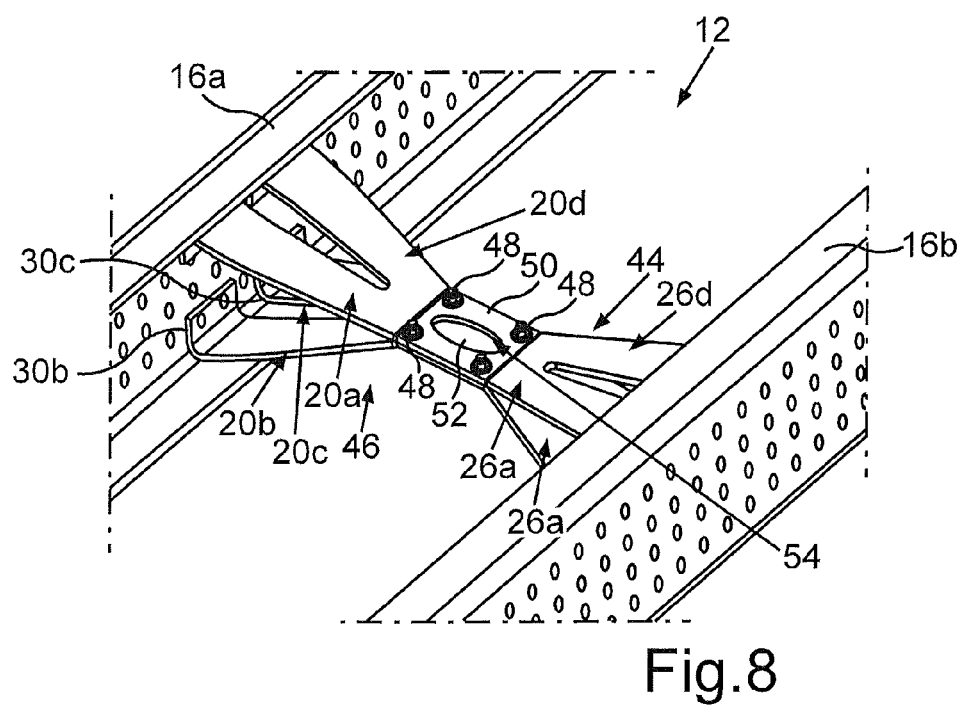

CROSS MEMBER FOR A FRAME OF A VEHICLE AS WELL AS FRAME FOR A VEHICLE

The invention relates to a cross member for a frame of a vehicle as well as a frame for a vehicle.

Such cross members and frames are well known from the serial production of trucks but also for other commercial and personal vehicles. The frame serves for supporting, for example, a body and a driver's cab of the truck. The frame comprises two lateral frame rails extending in the longitudinal direction of the vehicle, the frame rails having, for example, a C-shaped cross section.

The frame also has at least one cross member extending between the lateral frame rails. The cross member is mounted to the frame rails respectively and serves for stiffening the frame. Via the cross member, the frame rails are connected with one another.

Such a frame can be found, for example, in U.S. Pat. No. 6,286,868 B1, the frame comprising first and second parallel spaced-apart elongated side frame rails which each extend in a lengthwise direction of the truck. Each frame rail includes a central web portion with a length and first and second flange portions, the web portion having at least selected areas of a reduced thickness in comparison to the thickness of the flange portions. The selected areas of reduced thickness extend along at least a substantial portion of the length of the web. The frame also comprises plural elongated reinforcements mounted to the frame rails at selected locations of the web of reduced thickness.

JP 6-286644 A shows a frame for a truck, the frame comprising two lateral frame rails being spaced from each other in the transverse direction of the vehicle and the frame. The frame also comprises a cross member extending in the transverse direction of the vehicle, the cross member being arranged between the frame rails and attached to the frame rails.

Furthermore, a cross member connection for connecting a tubular cross member to rails of a vehicle frame can be found in U.S. Pat. No. 6,712,393 B2. The cross member connection comprises an outer plate including a flat portion and a curved portion. The cross member connection also comprises an inner plate including a flat portion and a curved portion, such tubular cross member including a bent tubular member having an end portion held between said inner plate and said outer plate and an elongated portion extending transversely from said end portion, said curved portions of said inner and outer plates extending away from said tubular member.

It is an object of the present invention to provide a cross member for a frame of a vehicle, wherein the cross member provides a particularly high stiffness of the frame, the cross member having a particularly low weight. This object is solved by a cross member having the features of patent claim 1.

It is also an object of the present invention to provide a frame for a vehicle, the frame having a particularly high stiffness and a particularly low weight. This object is solved by a frame having the features of patent claim 10. Advantageous embodiments with expedient and non-trivial developments of the invention are indicated in the other patent claims.

A first aspect of the present invention relates to a cross member for a frame of a vehicle. For example, the vehicle can be a utility vehicle or a truck or the like. The cross member comprises a base portion and a first support arrangement, the first support arrangement serving for connecting the cross member to a first frame rail of the frame. The first support arrangement has 4, 5, 6 or more support legs connected to the base portion, the 4, 5, 6 or more support legs of the first support arrangement being arranged on one side of the base portion. The support legs of the first support arrangement extend away from the base portion in the transverse direction of the vehicle and the frame.

The cross member also has a second support arrangement for connecting the cross member to a second frame rail of the frame. The second support arrangement has 4, 5, 6 or more further support legs connected to the base portion. The further support legs of the second support arrangement are arranged on the opposite side of the base portion. The further support legs of the second support arrangement extend away from the base portion and thus from the four support legs of the first support arrangement in the transverse direction of the vehicle.

At least two of the 4, 5, 6 or more support legs of the first support arrangement are bent upwards from the base portion, the other support legs, respectively at least two of the first support arrangement being bent downwards from the base portion. All these support legs are either bent up or bent down and each set comprises at least two support legs.

At least two of the 4, 5, 6 or more further support legs of the second support arrangement are bent upwards from the base portion, the other support legs of the second support arrangement being bent downwards from the base portion. All these support legs are either bent up or bent down and each set comprises at least two support legs.

By means of the cross member according to the present invention, a particularly high stiffness of the frame can be realized by connecting the spaced-apart frame rails with one another via the cross member. Via the bent support legs, the cross member can be supported on the frame rails in quite a large area so that loads can be taken and supported by the cross member in a very advantageous way. Moreover, the cross member can allow for a very advantageous distribution of loads between the frame rails. At the same time the weight of the cross member can be kept particularly low since the cross member has a very rigid structure.

In an advantageous embodiment of the invention the base portion and the support legs are formed in one piece. Thereby, the cross member can be manufactured in a very time- and cost-efficient way. Since the cross member is formed in one piece, additional processes such as welding, riveting or bolting for connecting multiple cross member pieces with each other can be avoided.

It has turned out to be particularly advantageous if the cross member with the base portion and the support legs is formed in one piece by stamping. For example, the one piece stamped cross member is made from sheet metal by stamping the sheet metal.

In a further advantageous embodiment of the invention, the cross member is made from aluminium or aluminium alloy. Thereby, the weight of the cross member can be kept particularly low.

It has turned out to be particularly advantageous if the cross member is made from 6013 T6 aluminium alloy. Thereby, a very high stiffness of the cross member itself can be realized.

In a further particularly advantageous embodiment of the invention the base portion and/or the support legs have a wall thickness of ⅜ inch or less. Hence, a very low weight of the cross member can be realized. Moreover, manufacturing costs can be kept very low.

In a further advantageous embodiment of the invention the respective support legs bent upwards are spaced from one another in the longitudinal direction of the vehicle, the respective other support legs bent downwards being arranged between the respective support legs bent upwards. Thus, the cross member can take and distribute loads and stresses in an advantageous way.

In a further particularly advantageous embodiment of the invention the support legs each have a flange via which the cross member is capable of being connected to the respective lateral frame rails of the frame. Via the flange, the cross member can be supported on the frame rails in planar fashion so that loads acting on the frame rails can be taken by the cross member in a very advantageous way.

In a further advantageous embodiment of the invention the flanges of the support legs bent upwards extend downwards, the flanges of the support legs bent downwards extending upwards. Thereby, the installation space required by the cross member in the vertical direction of the vehicle can be kept particularly low. At the same time, the cross member can be supported on the frame rails very advantageously. Since the installation space required by the cross member can be kept particularly low, there is plenty of installation space for other components to be mounted on the frame.

A second aspect of the present invention relates to a frame for a vehicle, in particular a truck. The frame comprises two lateral frame rails spaced from one another in the transverse direction of the vehicle, the frame rails extending in the longitudinal direction of the vehicle. The frame also comprises at least one cross member according to the present invention. The cross member is connected with the frame rails, the cross member extending between the frame rails. The cross member comprises a base portion and a first support arrangement by means of which the cross member is connected with one of the frame rails. The first support arrangement has 4, 5, 6 or more support legs connected to the base portion, the 4, 5, 6 or more support legs of the first support arrangement being arranged on one side of the base portion. The support legs of the first support arrangement extend away from the base portion in the transverse direction of the vehicle and the frame.

The cross member also has a second support arrangement by means of which the cross member is connected with the other frame rail. The second support arrangement has 4, 5, 6 or more further support legs connected to the base portion. The 4, 5, 6 or more further support legs of the second support arrangement are arranged on the opposite side of the base portion, the further support legs of the second support arrangement extending away from the base portion and thus the four support legs of the first support arrangement in the transverse direction of the vehicle.

Two of the support legs of the first support arrangement are bent upwards from the base portion, the other support legs of the first support arrangement being bent downwards from the base portion. Two of the 4, 5, 6 or more further support legs of the second support arrangement are bent upwards from the base portion, the other support legs of the second support arrangement being bent downwards from the base portion. Advantageous embodiments of the cross member according to the present invention are to be regarded as advantageous embodiments of the frame according to the present invention and vice versa.

The frame according to the present invention has a very high stiffness since the cross member has a very high stiffness itself. Thereby, the cross member adds stiffness, both in torsion and in bending to the frame, so that the weight of the frame according to the present invention can be reduced in comparison to conventional frames of trucks. Moreover, the frame can be manufactured in a very cost-efficient way since the frame rails as well as the cross member can be manufactured in a very time- and cost-efficient way. The cross member is designed to take loads acting on, for example, one of the frame rails and distribute the loads between the two frame rails.

Further advantages, features and details of the invention derive from the following description of preferred embodiments as well as from the drawings. The features and feature combinations previously mentioned in the description as well as the features and feature combinations mentioned in the following description of the figures and/or shown in the figures alone can be employed not only in the respective indicated combination, but also in any other combination or taken alone, without leaving the scope of the invention.

Figure 2:
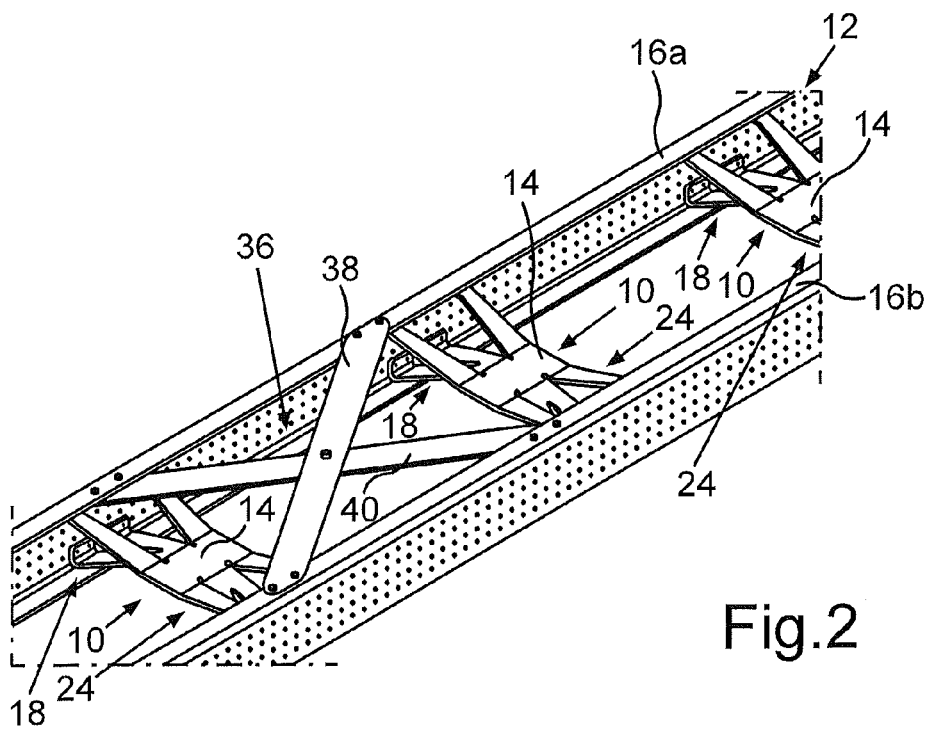
Figure 3:
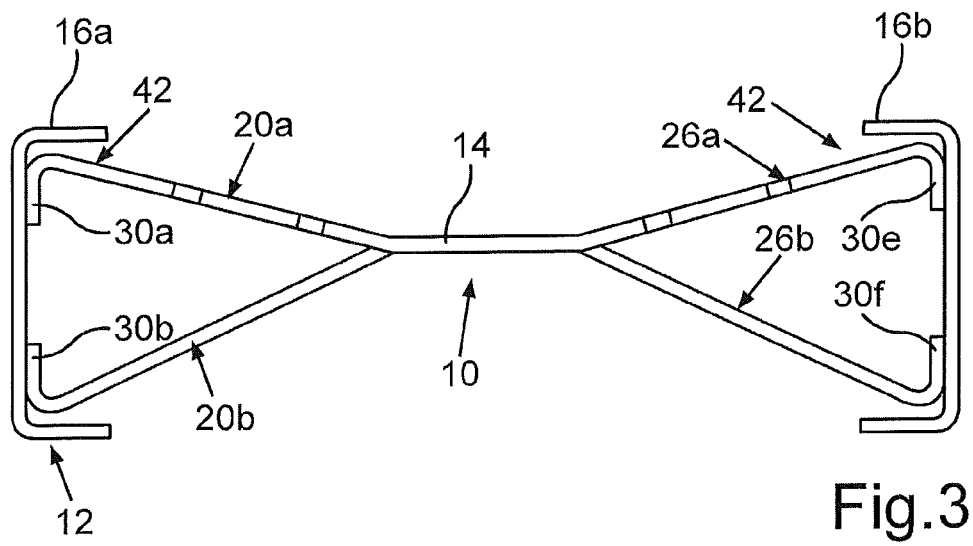
Figure 4:
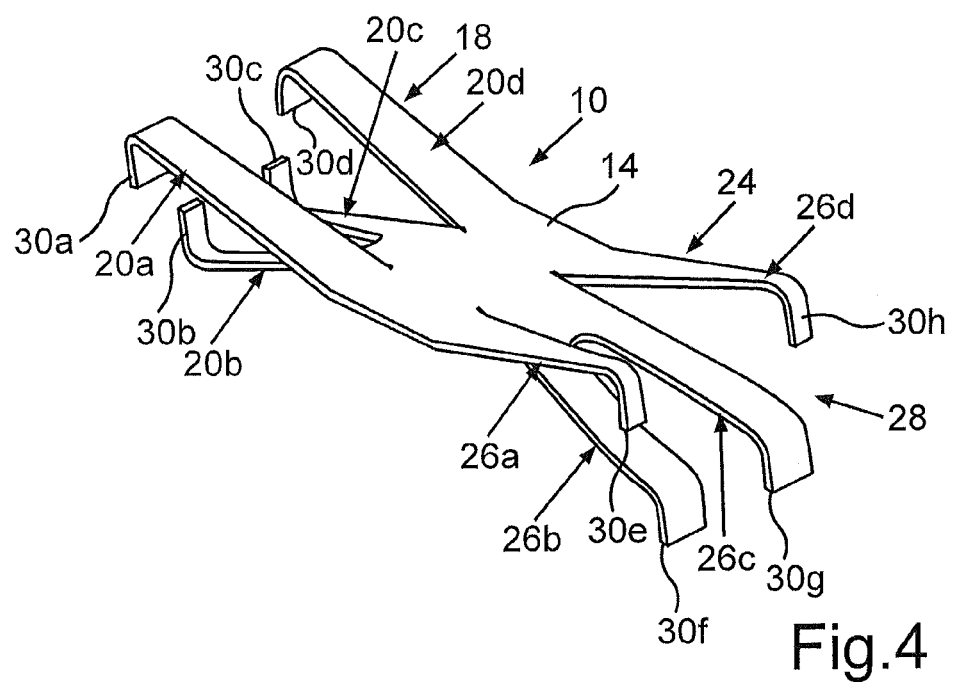

The drawings show in:

FIG. 1 a schematic and perspective view of a cross member according to a first embodiment for a frame of a truck, the cross member comprising a base portion, a first support arrangement having four support legs, and a second support arrangement having four further support legs, the cross member being capable of being connected to lateral frame rails of the frame via the respective support legs;

FIG. 2 a schematic and perspective view of the frame of the truck, the frame comprising the lateral frame rails and at least three cross members according to FIG. 1;

FIG. 3 a schematic front view of the frame according to FIG. 2;

FIG. 4 a schematic perspective view of the cross member according to a second embodiment;

FIG. 5 a schematic and perspective view of the cross member according to a preferred third embodiment;

FIG. 6 a schematic front view of the frame comprising the cross member according to the third embodiment;

FIG. 7 a schematic front view of the cross member according to the third embodiment; and FIG. 8 a schematic and perspective view of the frame comprising the cross member according to the third embodiment;

In the figures the same elements or elements having the same functions are equipped with the same reference numbers.

FIG. 1 shows a cross member 10 for a frame of a truck. Said frame is shown in FIG. 2 and designated by reference 12. The cross member 10 comprises a base portion 14 which—in relation to the position of the cross member 10 mounted on lateral frame rails 16a and 16b of the frame—extends at least substantially horizontally.

The cross member 10 has a first support arrangement 18 for connecting the cross member 10 to the frame rail 16a of the frame 12. The first support arrangement 18 has four support legs 20a-d connected to the base portion 14. The support legs 20a-d are arranged on one side 22 of the base portion. As can be seen from FIGS. 1 and 2, the support legs 20a-d of the first support arrangement 18 extend away from the base portion 14 in the transverse direction of the truck and the frame 12 towards the frame rail 16a.

The cross member 10 also comprises a second support arrangement 24 for connecting the cross member to the frame rail 16b. The second support arrangement 24 has four further support legs 26a-d connected to the base portion 14. The further support legs 26a-d of the second support arrangement 24 are arranged on the opposite side 28 of the base portion 14. In other words, the side 28 is opposite of the side 22. As can be seen from FIGS. 1 and 2, the further support legs 26a-d extend away from the base portion 14 and the support legs 20a-d in the transverse direction of the truck towards the frame rail 16b.

The cross member 10 is formed in one piece. This means that the base portion 14, the support legs 20a-d and the support legs 26a-d are formed in one piece. Furthermore, the cross member 10 is made by stamping. The one piece stamped cross member 10 is made from a 6013-T6 sheet of aluminium that is ⅜ inch thick so that the base portion 14 and the support legs 20a-d and 26a-d each have a wall thickness of ⅜ inch.

The support legs 20a and 20d of the first support arrangement 18 are bent upwards from the base portion 14, wherein the other support legs 20b and 20c of the first support arrangement 18 are bent downwards from the base portion 14 in the vertical direction of the truck. Moreover, the support legs 26a and 26d of the second support arrangement 24 are bent upwards from the base portion 14, whereas the support legs 26b and 26c of the second support arrangement 24 are bent downwards form the base portion 14 in the vertical direction of the truck.

The support legs 20a and 20d bent upwards are spaced from each other in the longitudinal direction of the truck and the frame 12. The support legs 20b and 20c bent downwards are arranged between the upwardly bent support legs 20a and 20d. Furthermore, the support legs 26a and 26d bent upwards are spaced from each other in the longitudinal direction of the tuck, wherein the support legs 26b and 26c bent downwards are arranged between the upwardly bent support legs 26a and 26d.

The support legs 20a-d and 26a-d each have a flange 30a-h via which the cross member 10 is connected to the lateral frame rails 16a and 16b. As can be seen from FIG. 1, the flanges 30a, 30d, 30e and 30h each have one through hole 32 for a respective screw. The flanges 30b, 30c, 30f and 30g each have two through holes 34 for a respective screw. The screws can be pushed through the through holes 32 and 34 respectively so that the cross member 10 can be mounted on the frame rails 16a and 16b via the flanges 30a-h by means of the screws. The flanges 30a, 30d, 30e and 30h of the support legs 20a, 20d, 26a and 26d bent upwards extend downwards, wherein the flanges 30b 30c, 30f and 30g of the support legs 20b, 20c, 26b and 26c bent downwards extend upwards.

FIG. 2 shows the frame 12 comprising the lateral frame rails 16a and 16b and three cross members 10 connected to the frame rails 16a, 16b, the frame rails 16a and 16b extending in the longitudinal direction of the truck. The frame 12 also comprises at least one substantially X-shaped structure 36 with two crosswise arranged beams 38, 40, each of the beams 38, 40 being connected to the frame rails 16a and 16b on both ends.

FIG. 3 shows the frame 12 in a front view. As can be seen from FIG. 3, the frame rails 16a and 16b are configured as C-shaped side channels each having an open cross section 42, wherein the cross member 10 engages the cross sections 42 respectively. The support legs 20a, 20d, 26a and 26d bent upwards are located at the outer edge wherein the support legs 20b, 20c, 26b and 26c bent downwards are located closest the cross members' centre.

The cross member 10 is symmetrical about its centre of gravity and provides clearance to the drive line of the truck by having its centre section or its base portion 14 raised in relation to the centres of the frame rails 16a and 16b respectively. Each cross member 10 is spaced 1400 mm on centre and provides a very high stiffness of the frame 12. At the same time, a very low weight of the frame 12 can be realized since the cross member 10 itself has a very high stiffness and a very low weight.

FIG. 4 shows the cross member 10 according to a second embodiment. As can be seen from FIG. 4, the flanges 30f and 30g of the support legs 26b and 26c bent downwards extend downwards. Comparing the frame 12 to conventional frames of trucks, by means of the cross member 10 the same stiffness or a higher stiffness as well as a reduced weight can be realized. Moreover, the frame 12 can be manufactured in a very cost-efficient way, since the cross member 10 itself can be manufactured in a very easy and cost-efficient way by stamping sheet metal made of aluminium.

FIG. 5 shows the cross member 10 according to a preferred third embodiment. The cross member 10 according to the third embodiment comprises an upper part 44 and a lower part 46, the parts 44, 46 being connected with other. In the third embodiment the parts 44, 46 are bolted together by four bolts 48 thereby creating the same functionality as the cross member 10 according to the first embodiment. Fastening of the parts 44, 46 can be done in any manner as well known in the prior art.

The upper part 44 has an upper part 50 of the base portion 14. Moreover, the upper part 44 has the support legs 20a, 20d, 26a and 26d, the upper part 50 and the support legs 20a, 20d, 26a, 26d being formed in one piece. The lower part 46 has a lower part 52 of the base portion 14 and the support legs 20a, 20d, 26a and 26d, the lower part 52 and the support legs 20a, 20d, 26a, 26d being formed in one piece. This means that both the upper part 44 and the lower part 46 are formed in one piece respectively.

Moreover, the upper part 44 has a void in the form of a trough opening 54 to reduce weight. Alternatively or additionally, the lower part 46 can have a void, for example, in the form of a through opening to keep the weight particularly low. In the third embodiment all eight flanges 30a-h are the same size and have two through openings 32, 34 each.

A chain line 56 in FIG. 6 illustrates the centre of the frame rails 16a and 16b. As can be seen from FIG. 6, the base portion 14 is displaced from the centre (chain line 56) towards the top in the vertical direction of the vehicle.

As can be seen from FIG. 7, the cross member 10 is narrower in the longitudinal direction of the vehicle in comparison with the first embodiment since the support legs 20b and 20c overlap the support legs 20a and 20d and the support legs 26b and 26c overlap the support legs 26a and 26d. Thereby, additional packaging space can be provided. Moreover, stresses can be reduced in areas where the base portion 14 meets the support legs 20a-d and 26a-d respectively. Preferably, the upper part 44 having is flatter from frame rail 16a to frame rail 16b or vice versa in comparison with the first embodiment. Moreover, the support legs 20b, 20c, 26b and 26c are bent more downwardly to the frame rails 16a and 16b. This provides proper clearance for the driveline. It is possible though, depending on the driveline clearance, to have the cross members 10 make a symmetrical x-shape as opposed to the base member being higher than the centre (chain line 56) of the frame rails 16a and 16b.

The cross member 10 according to the third embodiment is easily serviceable and the parts 44, 46 can be replaced, meaning the frame rails 16a and 16b do not need to be pried apart to service and/or replace the cross member 10. The lower part 46 can be installed first, then the upper part 44 can be slid into place easily and the parts 344, 46 can be bolted together. For example, air and electrical conduits can be run over the top of the base portion 14.

The invention claimed is:

1. A cross member (10) for a frame (12) of a vehicle, the cross member (10) comprising:
   a base portion (14);
   a first support arrangement (18) for connecting the cross member (10) to a first frame rail (16a) of the frame (12), the first support arrangement (18) having 4, 5, 6 or more support legs (20a-d) connected to the base portion (14), the support legs (20a-d) being arranged on one side (22)

of the base portion (14), the support legs (20*a-d*) extending away from the base portion (14) in the transverse direction of the vehicle;

a second support arrangement (24) for connecting the cross member (10) to a second frame rail (16*b*) of the frame (12), the second support arrangement (24) having 4, 5, 6 or more further support legs (26*a-d*) connected to the base portion (14), the further support legs (26*a-d*) being arranged on the opposite side (28) of the base portion (14), the further support legs (26*a-d*) extending away from the base portion (14) in the transverse direction of the vehicle;

wherein:

at least two (20*a*, 20*d*) of the support legs (20*a-d*) of the first support arrangement (18) are bent upwards from the base portion (14), the other support legs (20*b*, 20*c*) of the first support arrangement (18) being bent downwards from base portion (14);

at least two (26*a*, 26*d*) of the further support legs (26*a-d*) of the second support arrangement (24) are bent upwards from the base portion (14), the other support legs (26*b*, 26*c*) of the second support arrangement (24) being bent downwards from the base portion (14).

2. The cross member (10) according to claim 1 wherein the base portion (14) and the support legs (20*a-d*, 26*a-d*) are formed in one piece.

3. The cross member (10) according to claim 1, wherein the cross member (10) with the base portion (14) and the support legs (20*a-d*, 26*a-d*) is formed in one piece by stamping.

4. The cross member (10) according to claim 1, wherein the cross member (10) is made from aluminum or aluminum alloy.

5. The cross member (10) according to claim 4 wherein the cross member (10) is made from 6013-T6 aluminum alloy.

6. The cross member (10) according to claim 1, wherein the base portion (14) and/or the support legs (20*a-d*, 26*a-d*) have a wall thickness of ⅜ inch or less.

7. The cross member (10) according to claim 1, wherein the respective support legs (20*a*, 20*d*, 26*a*, 26*d*) bent upwards are spaced from one another in the longitudinal direction of the vehicle, the respective other two support legs (20*b*, 20*c*, 26*b*, 26*c*) being arranged between the respective support legs (20*a*, 20*d*, 26*a*, 26*d*) bent upwards.

8. The cross member (10) according to claim 1, wherein the support legs (20*a-d*, 26*a-d*) each have a flange (30*a-h*) via which the cross member (10) is capable of being connected to respective lateral frame rails (16*a-b*) of the frame (12).

9. The cross member (10) according to claim 8 wherein the flanges (30*a*, 30*d*, 30*e*, 30*h*) of the support legs (20*a*, 20*d*, 26*a*, 26*d*) bent upwards extend downwards, the flanges (30*b*, 30*c*, 30*f*, 30*g*) of the support legs (20*b*, 20*c*, 26*b*, 26*c*) bent downwards extending upwards.

10. A frame (12) for a vehicle, the frame (12) comprising:

two lateral frame rails (16*a-b*) spaced from one another in the transverse direction of the vehicle;

at least one cross member (10) connected with the frame rails (16*a-b*), the cross member (10) comprising:

a base portion (14);

a first support arrangement (18) by means of which the cross member (10) is connected with one (16*a*) of the frame rails (16*a-b*), the first support arrangement (18) having 4, 5, 6 or more support legs (20*a-d*) connected to the base portion (14), the support legs (20*a-d*) being arranged on one side (22) of the base portion (14), the support legs (20*a-d*) extending away from the base portion (14) in the transverse direction of the vehicle;

a second support arrangement (24) by means of which the cross member (10) is connected with the other frame rail (16*b*), the second support arrangement (24) having 4, 5, 6 or more further support legs (26*a-d*) connected to the base portion (14), the further support legs (26*a-d*) being arranged on the opposite side (28) of the base portion (14), the further support legs (26*a-d*) extending away from the base portion (14) in the transverse direction of the vehicle;

wherein:

at least two (20*a*, 20*d*) of the support legs (20*a-d*) of the first support arrangement (18) are bent upwards from the base portion (14), the other support legs (20*b*, 20*c*) of the first support arrangement (18) being bent downwards from base portion (14);

at least two (26*a*, 26*d*) of the further support legs (26*a-d*) of the second support arrangement (24) are bent upwards from the base portion (14), the other support legs (26*b*, 26*c*) of the second support arrangement (24) being bent downwards from base portion (14).

* * * * *